United States Patent [19]

Peterson

[11] 4,314,583
[45] Feb. 9, 1982

[54] BACKWATER VALVE

[76] Inventor: Harold A. Peterson, 8300 Ryan Rd., Richmond, British Columbia, Canada, V7A 2E6

[21] Appl. No.: 157,473

[22] Filed: Jun. 9, 1980

[51] Int. Cl.³ .............................................. F16K 15/04
[52] U.S. Cl. ................................................ 137/533.11
[58] Field of Search ...................... 137/247.15, 247.17, 137/247.21, 533.11, 533.13, 533.15

[56] References Cited

U.S. PATENT DOCUMENTS

| | | | |
|---|---|---|---|
| 174,874 | 3/1876 | Thorp | 137/247.21 |
| 382,656 | 5/1888 | Montgomery | 137/533.15 X |
| 913,338 | 2/1909 | Williams | 137/247.21 |
| 1,109,740 | 9/1914 | Dehn | |
| 1,488,597 | 4/1924 | Gleason | 137/247.21 X |
| 1,847,068 | 3/1932 | Campbell | 137/533.11 X |
| 2,192,541 | 3/1940 | Davis | 137/533.13 X |
| 2,278,715 | 4/1942 | Stoyke et al. | 137/533.13 |
| 2,865,390 | 12/1958 | Bowen et al. | |
| 3,011,517 | 12/1961 | Sanford | 137/533.13 |
| 3,648,729 | 3/1972 | Balkany | 137/533.15 |
| 4,007,710 | 2/1977 | Johnson | |

FOREIGN PATENT DOCUMENTS 75427 2/1931 Sweden ......................... 137/533.11

Primary Examiner—Robert G. Nilson
Attorney, Agent, or Firm—Richard H. Zaitlen

[57] ABSTRACT

A check valve insert for installation between the inlet and outlet ports of a conventional "T" pipe coupling. The insert comprises a coupler for insertion into the coupling inlet port, a guide sleeve affixed to the coupler to project into the conduit, and a check ball positioned within the guide sleeve. The coupler includes a valve seat against which the check ball may rest to prevent fluid passage from the coupling outlet port to its inlet port. A plurality of apertures are spaced around the upper end of the guide sleeve above the coupling outlet port. Fluid outside the conduit which rises above the check ball enters the coupling inlet port and eventually lifts the ball away from the valve seat. The fluid passes up into the guide sleeve to flow through the apertures and exit via the coupling outlet port. Sufficient clearance is provided between the check ball and the guide sleeve to prevent lodging therebetween of foreign particulate matter which might jam the check ball. The components of the insert are designed to inhibit accumulation of foreign particulate matter which might interfere with movement of the check ball or sealing engagement thereof with the valve seat. The insert is also fashioned to facilitate cleaning without requiring removal of the insert from the coupling.

5 Claims, 1 Drawing Figure

U.S. Patent
Feb. 9, 1982
4,314,583
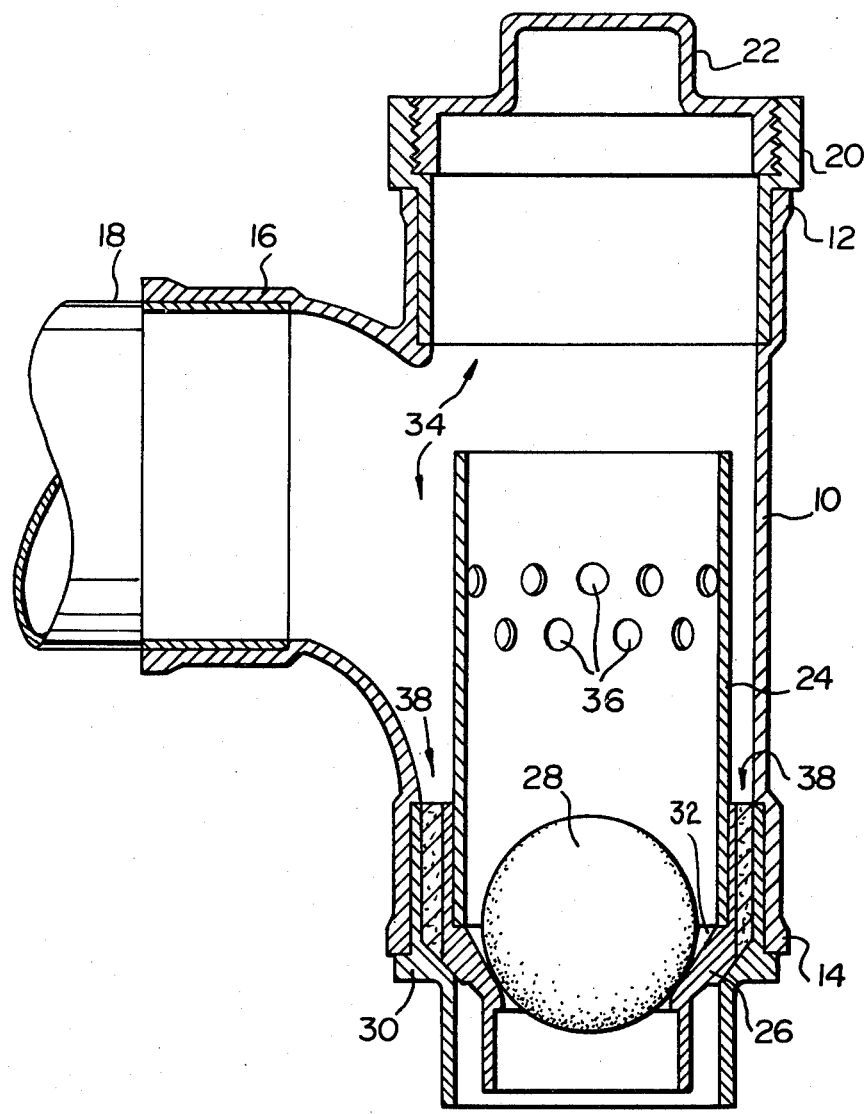

BACKWATER VALVE

BACKGROUND OF THE INVENTION

1. Field of the Invention

This invention relates to check valve inserts for use with conventional plumbing "T" type couplings to make ball-type check valves which are particularly adapted for use in manholes that drain into storm sewers or ditches.

2. Description of the Prior Art

A common check valve design utilizes a "T" shaped casing having a vertically oriented inlet port through which fluid may pass vertically to exit via a laterally extending outlet port. Such designs commonly employ a valve seat in the inlet port and a ball closure member or "check ball" which is moveable in a substantially vertical direction. To prevent loss of the check ball through the outlet port, some devices provide enlarged cavities between the inlet and outlet ports to permit the use of a check ball having a diameter greater than that of the outlet port. However, casings for such devices generally need to be custom manufactured which renders fabrication relatively complicated and expensive.

U.S. Pat. No. 3,648,729 issued Mar. 14, 1972 to John W. Balkany shows a valve insert assembly for converting an ordinary pipeline "T" coupling into a ball type check valve which thus obviates the need for fabrication of a special casing. The Balkany insert includes a spring which surrounds the check ball to constrain it to movement in a substantially vertical direction.

Another method for preventing loss of the check ball through the outlet port is shown in U.S. Pat. No. 2,278,715 issued Apr. 7, 1942 to Ludwig T. Stoyke et al, which discloses use of an apertured guide sleeve to surround the check ball and constrain it to movement in a substantially vertical direction.

The spring (in the Balkany device) and the sleeve (in the Stoyke device) serves to guide the check ball to and from the valve seat.

Although either of the Balkany or Stoyke devices may be used in conventional pipeline "T" couplings, they are susceptible to accumulation around the valve seat area of solid material which may be present in the fluid passing through the valve. Such accumulations may eventually result in fluid leakage past the check ball when the ball is in the "closed" or seated position. Furthermore, the Stoyke device is said to operate most satisfactorily when the clearance between the check ball and the guide sleeve is less than a specific amount. At some point, a minimum clearance between the check ball and the guide sleeve will be reached below which accumulations of solid material may inhibit free movement of the check ball within the guide sleeve eventually resulting in leakage past the check ball. Both the Balkany and Stoyke devices must be disassembled to provide access to the valve seat area for removal of accumulated deposits therefrom. This problem is exacerbated where the device is to be installed, for example to control drainage from a manhole into a sewer or ditch, because relatively substantial amounts of solid foreign matter may enter the valve assembly.

It is an object of the present invention to provide a check valve insert for use with a conventional pipeline "T" coupling which enables easy access for cleaning to remove accumulated deposits of solid material without necessitating disassembly or removal of the insert from the "T" coupling. A related object is to provide a check valve insert which is constructed to inhibit accumulation of particulate foreign matter which may interfere with free movement of the check ball or prevent adequate sealing engagement of the check ball with the valve seat.

Summary of the Invention

The invention is directed to a check valve insert for installation between the inlet and outlet ports of a fluid conduit. The fluid conduit outlet port communicates with a drainage conduit. The insert comprises an apertured coupler for insertion into the inlet port of the conduit. The coupler includes a valve seat around the aperture. The insert also comprises a cylindrically apertured guide sleeve fixed to the coupler to project into the conduit above the valve seat and permit fluid communication from the inlet port through the coupler aperture and through the sleeve aperture to the outlet port. The sleeve includes a plurality of apertures spaced around its upper end. The insert further comprises a ball closure member positioned within the sleeve for sealing engagement against the valve seat to prevent fluid communication from the outlet port to the inlet port. When the insert is installed in the conduit, the plurality of sleeve apertures are positioned above the lowest point of entry from the conduit outlet port to the drainage conduit.

Preferably, the ball closure member is sized to permit passage of solid particulate matter of a predetermined size between the ball closure member and the interior walls of the sleeve.

Advantageously, the sleeve is fixed to the coupler to provide a smooth transition between the sleeve and the valve seat.

Advantageously, the sleeve is sized to permit insertion of a drain cleaning tool past the sleeve and into the conduit when the insert is installed in the conduit.

Preferably, the ball closure member is formed of material having a density which is greater than that of water and which is such that fluid rising around the conduit to about the lowest point of entry from the conduit outlet port to the drainage conduit lifts the ball closure member above the valve seat.

BRIEF DESCRIPTION OF THE DRAWING

The FIGURE is a cross-sectional side elevation view of one embodiment of the check valve insert which is shown installed in a conventional plumbing "T" fitting.

DESCRIPTION OF AN EMBODIMENT OF THE INVENTION

A conventional hollow plumbing pipleine "T"-shaped fitting or "conduit" 10 has vertically opposed upper and lower ends 12 and 14 respectively. Lower end 14 is left open to serve as an inlet port through which fluid may pass vertically to enter leg 16 which projects from the side of conduit 10 to serve as an outlet port. Leg 16 is connected to a drainage conduit such as drain pipe 18 which leads to a storm sewer or ditch. A threaded adaptor 20 is fixed in upper end 12 to removably receive threaded plug 22 which prevents fluid passage through upper end 12. Plug 22 may be removed to facilitate cleaning as hereinafter described.

The check valve insert comprises cylindrically apertured guide sleeve 24, coupler 26 and ball closure member or "check ball" 28. Coupler 26 is sized to fit snugly in conduit lower end 14. In cases where the external diameter of coupler 26 is too small to permit it to be snugly fitted within lower end 14 it will be necessary to include pipe increase coupler 30 to support coupler 26 in conduit lower end 14. Coupler 26 is rigidly affixed to pipe increase coupler 30 with a suitable cement such as Weldon Plastic Pipe Cement. Coupler 26 is apertured to permit fluid to pass from the inlet port through coupler 26. A bevelled valve seat 32 is provided around the coupler aperture. Check ball 28 is sized to permit sealing engagement with valve seat 32 whereby fluid flow from the conduit outlet port to its inlet port is prevented.

Guide sleeve 24 is rigidly affixed to coupler 26 to project into conduit 10 above valve seat 32 and to permit fluid communication from the conduit inlet port through the coupler and sleeve apertures to the conduit outlet port. Guide sleeve 24 also serves as a vertical channel within which check ball 28 is constrained to travel. The length of guide sleeve 24 is selected to leave a passageway 34 between the inner surface of conduit 10 and the uppermost rim of sleeve 24 through which a drain cleaning tool may be passed as hereinafter described.

A pluraity of apertures 36 are spaced around the upper end of sleeve 24 such that when the insert is installed in conduit 10, the apertures are just above the lowest point of entry from the conduit outlet port into drain pipe 18. Apertures 36 are sized to prevent passage therethrough of relatively large solid particles which may wash back into conduit 10 from drain pipe 18 if fluid levels in adjacent storm sewers are abnormally high. (In such cases, check ball 28 will prevent fluid passage from drain pipe 18 through the conduit inlet port). However, apertures 36 should not be made so small that they inhibit the free flow of fluid therethrough. In practice, the combined cross-sectional area for all of the apertures 36 should be about equal to the cross-sectional area of the aperture in coupler 26.

The recessed annular region 38 surrounding the lower end of sleeve 24 serves as a receptical to trap particulate foreign matter which may wash back into coupling 10 from drain pipe 18.

Check ball 28 should be made of a material having a density which is greater than that of water, but which is sufficiently low to permit fluid pressure (the fluid is typically water) to lift the check ball free of valve seat 32 when fluid levels outside conduit 10 rise to about the lowest point of entry from conduit 10 into the conduit outlet port. The diameter of check ball 28 should be selected with reference to the inside diameter of sleeve 24 to permit solid particulate matter of a predetermined size to pass between the check ball and the sleeve without inhibiting free movement of the check ball within the sleeve and without restricting the free flow of fluid through sleeve 24. For example, in applications where the check valve insert is to be installed in a conduit which is near the bottom of a manhole housing electrical cables, there should be sufficient clearance between check ball 28 and sleeve 24 to permit passage of particulate matter such as stripped wire ends which may be carried into the conduit with fluids which accumulate in the manhole.

The positioning of apertures 36 relative to the point of entry from conduit 10 into the conduit outlet port; the total area of apertures 36 relative to the area of the aperture in coupler 26; the density of check ball 28 and its size relative to sleeve 24 are all selected to ensure that the valve will open to drain fluid surrounding conduit 10 into drain pipe 18 when fluid surrounding conduit 10 rises to about the lowest point of entry from the conduit outlet port into drain pipe 18. It has been found that a one and one-half inch diameter rubber lacrosse ball (available at sporting goods stores) serves as a satisfactory check ball for use in conventional 4" diameter pipe systems.

It is important to eliminate within the check valve insert, as far as practically possible, crevices and interstices which may trap foreign particulate matter leading to build-ups which may eventually inhibit the free movement of check ball 28 in sleeve 24 or prevent adequate sealing of check ball 28 against valve seat 32. To this end, sleeve 24 and coupler 26 are formed to provide a smooth transition around the rim of valve seat 32 where it contacts sleeve 24. In addition, the interior surface of sleeve 24 is made smooth to inhibit accumulations of foreign material in sleeve 24 which might interfere with free movement of check ball 28 in sleeve 24.

In operation, the check valve insert is installed as shown in conduit 10. Conduit 10 may, for example, be located near the bottom of a manhole. As fluid levels rise in the manhole with respect to check ball 28 (for example, due to rains or drainage into the manhole) fluid will enter the conduit inlet port and check ball 28 will eventually be lifted free of valve seat 32 enabling fluid to pass up through the aperture in coupler 26 and into sleeve 24. The fluid may continue to rise in sleeve 24 to the level of apertures 36 at which point the fluid will pass through apertures 36 and into annular region 38 which will quickly be filled. Once region 38 is filled, fluid may exit conduit 10 through leg 16 and drain pipe 18 to a storm sewer or ditch.

Particulate foreign matter present in the manhole such as stripped wire ends, dirt, etc. may be carried by rising fluid levels into sleeve 24 and pass through apertures 36 to accumulate in annular region 38. Also, over time, particulate foreign matter may accumulate in annular region 38 due to fluid backflows from drain pipe 18. In either case, it will be desirable to remove threaded plug 22 at periodic intervals and use a drain cleaning tool to remove the accumulated foreign matter from annular region 38. After threaded plug 22 has been removed from adaptor 20, the drain cleaning tool may be inserted through conduit upper end 12 and passageway 34 into annular region 38. In like manner, the drain cleaning tool may be passed through conduit upper end 12 and passageway 34 into drain pipe 18 to clear blockages from the drain pipe.

To avoid corrosion in salt water environments encountered in low lying tidal areas, the components of the check valve insert may be made from suitable materials such as plastic.

Obvious variations in detail, construction and scale may be made without departing from the scope of the invention as defined in the appended claims. In the description and claims, words such as "upper" and "lower" are to be taken in a relative rather than and absolute sense.

I claim:

1. A check valve insert for installation between the inlet and outlet ports of a fluid conduit, said outlet port communicating with a drainage conduit, said insert comprising:

(a) an apertured coupler for insertion into the inlet port of said fluid conduit, said coupler including a valve seat around said aperture;

(b) a cylindrically apertured guide sleeve fixed to said coupler to project into said fluid conduit above said valve seat and permit fluid communication from said inlet port through said coupler aperture and through said sleeve aperture to said outlet port, said sleeve including a plurality of apertures spaced around the upper end of said sleeve; and, (c) a ball closure member positioned within said sleeve for sealing engagement against said valve seat to prevent fluid communication from said outlet port to said inlet port;

wherein, when said insert is installed in said fluid conduit, said plurality of sleeve apertures are positioned above the lowest point of entry from said fluid conduit outlet port to said drainage conduit.

2. A check valve insert as defined in claim 1, wherein said ball closure member is sized to permit passage of solid particulate matter of a predetermined size between said ball closure member and the interior walls of said sleeve.

3. A check valve insert as defined in claim 1, wherein said sleeve is fixed to said coupler to provide a smooth transition between said sleeve and said valve seat.

4. A check valve insert as defined in claim 1, or 2, wherein said sleeve is sized to permit insertion of a drain cleaning tool past said sleeve and into said fluid conduit when said insert is installed in said fluid conduit.

5. A check valve insert as defined in Claim 1, or 2, wherein said ball closure member is formed of material having a density which is greater than that of water and which is such that fluid rising around said fluid conduit to about the lowest point of entry from said fluid conduit outlet port to said drainage conduit lifts said ball closure member above said valve seat.

\* \* \* \* \*